US012777999B2

(12) United States Patent
Hubner et al.

(10) Patent No.: US 12,777,999 B2
(45) Date of Patent: Nov. 3, 2026

(54) SEED FIRMING SYSTEM WITH ADJUSTABLE FORCE AND LOCKUP

(71) Applicant: DEERE & COMPANY, Moline, IL (US)

(72) Inventors: Cary S. Hubner, Geneseo, IL (US); Veronica Sanchez Benavides, Monterrey (MX); Carlos Alberto Soto Lozano, Guadalupe (MX)

(73) Assignee: DEERE & COMPANY, Moline, IL (US)

( * ) Notice: Subject to any disclaimer, the term of this patent is extended or adjusted under 35 U.S.C. 154(b) by 308 days.

(21) Appl. No.: 18/428,748

(22) Filed: Jan. 31, 2024

(65) Prior Publication Data

US 2025/0241228 A1 Jul. 31, 2025

(51) Int. Cl.

*A01C 5/06* (2006.01)
*A01B 63/00* (2006.01)
*A01C 7/20* (2006.01)

(52) U.S. Cl.

CPC .............. *A01C 5/068* (2013.01); *A01C 7/205* (2013.01); *A01B 63/002* (2013.01)

(58) Field of Classification Search

CPC ........ A01C 5/068; A01C 7/205; A01B 63/002

See application file for complete search history.

(56) References Cited

U.S. PATENT DOCUMENTS 5,398,625 A 3/1995 Johnson et al.
5,595,130 A * 1/1997 Baugher ................ A01C 5/068 111/164
5,724,903 A * 3/1998 Yoder .................... A01C 5/068 111/194
5,802,995 A 9/1998 Baugher et al.

(Continued)

FOREIGN PATENT DOCUMENTS

EP 3307050 B1 8/2023
FR 2573610 A1 5/1986
WO WO 2020049467 A1 3/2020

OTHER PUBLICATIONS

Extended European Search Report and Written Opinion issued in European Patent Application No. 24219949.5 dated Jun. 3, 2025, in 13 pages.

Keeton-Ensure seed to soil contact by Precision Planting, retrieved from <URL: https://www.precisionplanting.com/products/planters/keeton, on Apr. 14, 2026, 15 pages.

(Continued)

*Primary Examiner* — Matthew R Buck

(57) ABSTRACT

A seed firming system for a planting machine includes an attachment bracket having a portion provided for attachment to a row unit of the planting machine. The system includes an arm pivotably coupled to the attachment bracket. The arm includes a ground-facing surface configured for engagement with soil during planting a tension arm spaced apart from the ground-facing surface and a plurality of tension connectors disposed in the tension arm. The system includes an elastic (Continued)

member including a first end coupled to the attachment bracket, and a second end removably coupled to one of the tension connectors. The second end of the elastic member is interchangeably couplable to each of the plurality of tension connectors. The elastic member is configured to provide a unique elastic force through the ground-facing surface when coupled to each respective one of the tension connectors.

19 Claims, 6 Drawing Sheets

(56) References Cited

U.S. PATENT DOCUMENTS

| | | | | |
|---|---|---|---|---|
| 6,666,156 | B1 * | 12/2003 | Mayerle | A01C 7/201<br>111/150 |
| 9,839,178 | B2 | 12/2017 | Garner et al. | |
| 10,091,927 | B2 | 10/2018 | Garner et al. | |
| 2008/0184920 | A1 * | 8/2008 | Thompson | A01C 7/20<br>111/14 |
| 2017/0086362 | A1 * | 3/2017 | Natarjan | A01B 61/046 |
| 2019/0297772 | A1 * | 10/2019 | Andres | A01C 7/205 |
| 2021/0068338 | A1 | 3/2021 | Stoller et al. | |
| 2022/0046848 | A1 * | 2/2022 | Strnad | A01C 5/062 |

OTHER PUBLICATIONS

Screen captures from YouTube video clip entitled “Keeton & Mojo wires: Installation & Adjustment”. Retrieved from Internet: <http://www.youtube.com/widgetdemo>.
Screen captures from YouTube video clip entitled “Mojo Wire Comparison—Keeton seed firmer with and without the Mojo Wire in no till conditions”. Retrieved from Internet: <https://www.youtube.com/watch?v=HgvqtFBIBXM>.
Pro-Stitch Spiked Closing Wheels, retrieved from <URL: https://www.precisionplanting.com/products/planters/keeton, on Apr. 14, 2026, 07 pages.
Copperhead, retrieved from <URL: https://www.copperheadag.com/collections/closing-wheels, on Apr. 14, 2026, 16 pages.
Closing Wheels, retrieved from <URL: https://maywes.com/collections/closing-wheels?srsltid=AfmBOooXVu4olp0rR7HWWxkKZ-0mJup0lUAmhlrXn73Yu_VHQpNJARvS, on Apr. 14, 2026, 03 pages.
FurrowJet-In-furrow starter fertilizer placement by Precision Planting, retrieved from <URL: https://www.precisionplanting.com/products/planters/keeton, on Apr. 14, 2026, 15 pages.
Mojo Wire, retrieved from <URL: https://www.precisionplanting.com/products/planters/keeton, on Apr. 14, 2026, 03 pages.
Dual 13 Spike Closing Wheel, retrieved from <URL: https://sidist.com/index.cfm?fuseaction=category.display&Category_id=2082, on Apr. 14, 2026, 04 pages.

* cited by examiner

SEED FIRMING SYSTEM WITH ADJUSTABLE FORCE AND LOCKUP

TECHNICAL FIELD

The present disclosure relates to seed firmers for firming seeds during planting.

BACKGROUND

Seed firmers generally provide force to seeds and a surrounding ground surface in a seeding furrow based on a generally fixed stiffness based on compliance or flexibility of material that the firmer is made from. As such, a particular seed firmer generally provides a substantially uniform force range during its operational life. In some instances, after-market parts are used to change the force provided by a seed firmer, which requires removal, modification and reinstallation of the seed firmer.

SUMMARY

According to one aspect, the present disclosure includes a seed firming system for a planting machine. The seed firming system includes an attachment bracket having a portion provided for attachment to a row unit of the planting machine an arm pivotably coupled to the attachment bracket and including a ground-facing surface configured for engagement with the soil during planting, a tension arm spaced apart from the ground-facing surface, and a plurality of tension connectors disposed in the tension arm. The seed firming system includes an elastic member including a first end coupled to the attachment bracket, and a second end removably coupled to one of the plurality of tension connectors. The second end of the elastic member is interchangeably couplable to each of the plurality of tension connectors. The elastic member is configured to provide a unique elastic force through the ground-facing surface when coupled to each respective one of the plurality of tension connectors.

In some aspects, the second end of the elastic member is movable between each respective one of the plurality of tension connectors while the arm is coupled to the attachment bracket.

In some aspects, each respective one of the plurality of tension connectors is arranged such that an effective angle between the elastic member and the tension arm varies when the elastic member is coupled to each respective one of the plurality of tension connectors.

In some aspects, the plurality of tension connectors is disposed in series along a length of the tension arm.

In some aspects, the arm further comprises a leading surface disposed at an angle with respect to a plane of the ground-facing surface.

In some aspects, the angle is an angle from about 10 deg. to about 30 deg.

In some aspects, the tension arm is coupled to the leading surface of the arm.

In some aspects, the arm includes a substantially rigid material.

In some aspects, the arm comprises a substantially deformable material.

In some aspects, the elastic member is a spring.

In some aspects, the elastic member is a coil spring.

According to another aspect, the present disclosure includes a seed firming system for a planting machine, the seed firming system includes an attachment bracket having a portion provided for attachment to a row unit of the planting machine. The seed firming system includes an arm coupled to the attachment bracket, the arm including a ground-facing surface for engagement with a ground surface during planting. The seed firming system includes, a stowing mechanism having a first pin operable to secure the arm relative to the attachment bracket. The stowing mechanism is selectively configurable between a first position in which the ground-facing surface is positioned to abut the ground surface during operation and a second position in which the ground-facing surface is positioned to be spaced apart from the ground surface during operation.

In some aspects, the arm is pivotably coupled to the attachment bracket.

In some aspects, the pin is extendable through a portion of the attachment bracket and the arm such that the arm is locked in a fixed position with respect to the bracket.

In some aspects, the arm includes a first pin receiver configured to secure the arm in the extended position when the pin is extended through the attachment bracket and the first pin receiver.

In some aspects, the arm is at least partially pivotable when in the extended position.

In some aspects, the arm includes a second pin receiver configured to secure the arm in the stowed position when the pin is extended through the attachment bracket and the second pin receiver.

In some aspects, the arm is elastically biased to the extended position.

In some aspects, the stowing mechanism is configured such that the arm is movable between the stowed position and the extended position while the arm is coupled to the attachment bracket.

According to another aspect, the present disclosure includes a row unit including a furrow opener, furrow closing wheels behind the opener, a seed dispenser between the opener and the closing wheels, and a seed firming system coupled to the row unit behind the seed dispenser and forward of the closing wheels. The row unit includes an attachment bracket having a portion provided for attachment to a row unit of the planting machine. The row unit includes an arm coupled to the attachment bracket, the arm including a ground-facing surface for engagement with a ground surface during planting. The row unit includes a stowing mechanism having a first pin operable to secure the arm relative to the attachment bracket. The stowing mechanism is selectively configurable between a first position in which the ground-facing surface is positioned to abut the ground surface during operation and a second position in which the ground-facing surface is positioned to be spaced apart from the ground surface during operation.

Other features and aspects will become apparent by consideration of the detailed description, claims, and accompanying drawings.

BRIEF DESCRIPTION OF THE DRAWINGS

The detailed description of the drawings refers to the accompanying figures.

Like reference numerals are used to indicate like elements throughout the several figures.

DETAILED DESCRIPTION

Various examples of seed firming systems (i.e., seed firmers) are provided herein. Seed firmers such as the examples described herein are provided to press seeds into soil as a planting machine distributes seeds into the ground. Seed firmers generally provide a substantially consistent/fixed firming force to a surface once installed. This force is generally based on the stiffness of the materials used to form the seed firmer. However, a seeding operation may utilize a plurality of pressing forces based on various factors such as soil density, soil composition, seed type, and soil hydration. As such, a seed firmer that has an adjustable firming force would be beneficial to accommodate the factors that affect desired pressing force. In some instances, no firming force may be required (e.g., muddy conditions, rocky surfaces, non-planting surfaces). In such instances, where no firming force is desired, it may be beneficial to adjust a seed firmer to a stowed position so that the seed firmer and/or ground surface is not damaged or otherwise affected in an undesired way.

Example seed firmers are provided herein that include one or more springs that provide firming force and a plurality of tension connectors that provide a plurality of effective angles for the spring to act through a ground-facing surface of the seed firmer. Example seed firmers are also provided herein that include a stowing mechanism to adjust the seed firmer such that the ground-facing surface 124 does not touch a ground surface (e.g., a furrow surface) during operation. The examples provided herein further provide mechanisms for a user to adjust the seed firmer (e.g., firming force adjustment and stowing) while the seed firmer is coupled to a row unit.

Figure 1:
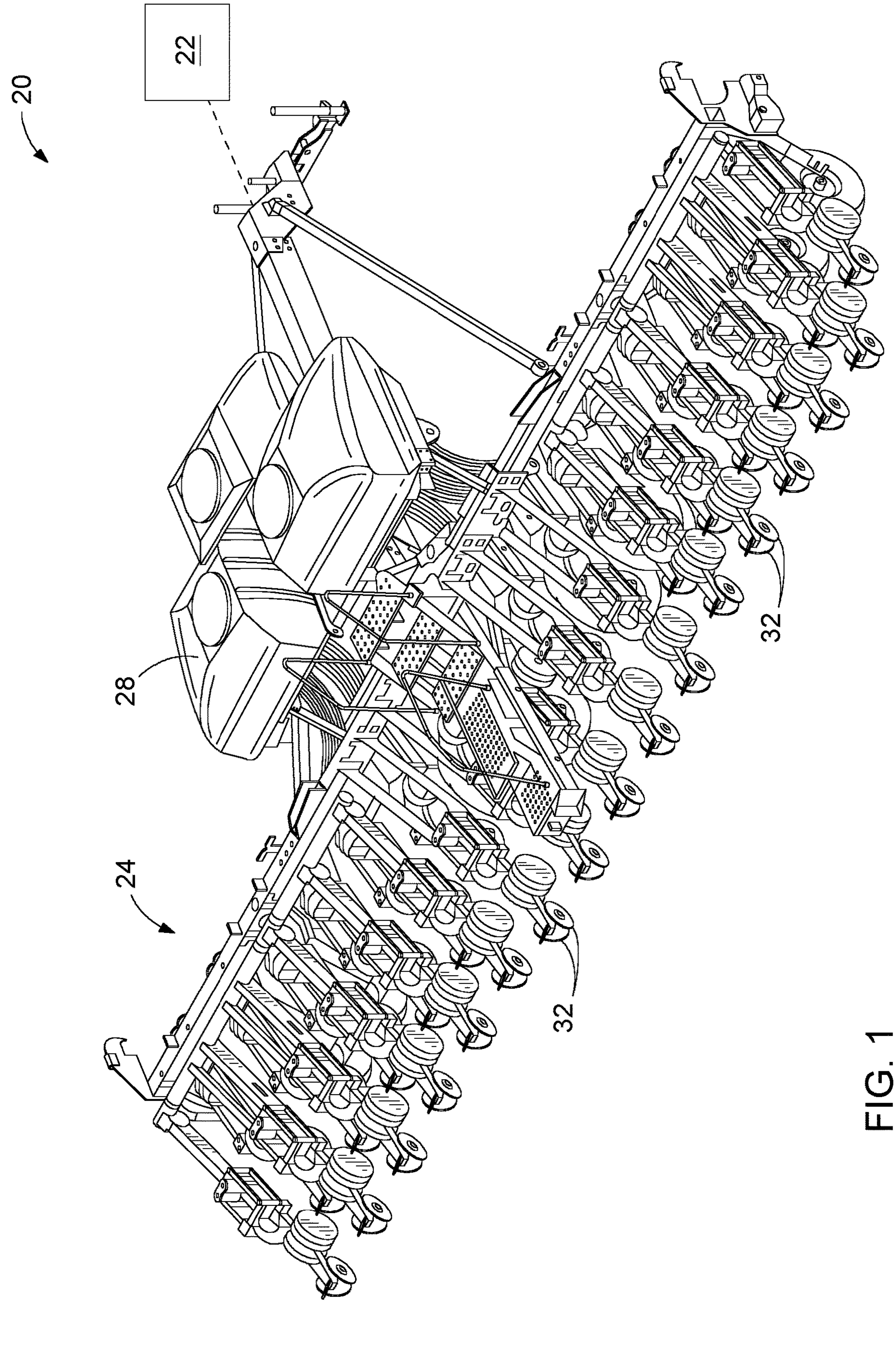
FIG. 1 is a perspective view of a planter including a plurality of row units.

FIG. 1 illustrates an agricultural planting machine 20 connected to a tractor 22 for planting seeds into soil as the planting machine 20 is conveyed by the tractor 22 through a field. The planting machine 20 includes a plurality of row units 24 provided side-by-side with each other for simultaneously planting a plurality of crop rows. Each row unit 24 may include one or more hoppers 28 for seeds S (FIG. 2), and in some constructions may deliver liquid and/or granular additives such as fertilizer or pesticide that may selectively accompany the seeds S when planted.

Figure 2:
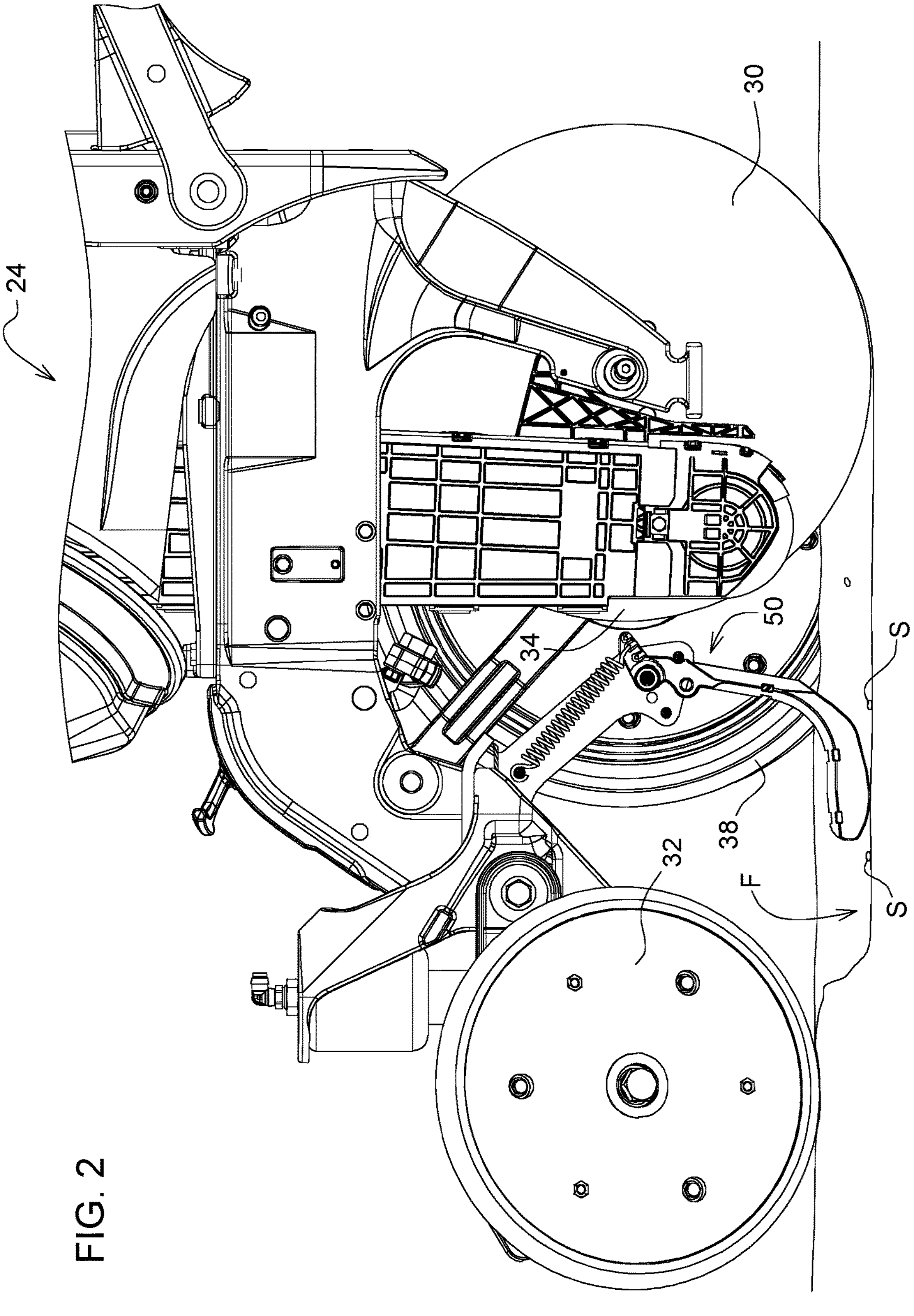
FIG. 2 is a schematic view of a planting operation carried out with one of the row units of FIG. 1.

As shown in FIG. 2, each row unit 24 has an opener 30 operable to cut a trench or furrow F into the soil as the planting machine 20 moves along the ground. A set of closing wheels 32 trail behind the opener 30 and are operable to close the furrow F after seeds are dispensed. A cartridge 34 of the row unit 24 operates to dispense seeds S rearward of the opener 30 into the furrow F, prior to arrival of the closing wheels 32. In some constructions, the row unit 24 is a high performance device in which the cartridge 34 is operable to accurately dispense the seeds S at regular intervals at high forward travel speed (e.g., over 7 miles per hour, and even over 9 or 10 miles per hour) of the planting machine 20 relative to the ground, referred to herein as planting speed. The cartridge 34 may include a brush belt 38 as part of a seed delivery mechanism. The cartridge 34 may operate to dispense the seeds S rearward and downward such that a horizontal velocity component is equal in magnitude to the planting speed, and oriented in the opposite direction such that each seed S approaches the ground with no net horizontal velocity to reduce bounce and enhance repeatability in the final seed positioning. In other constructions, the cartridge 34 may comprise a gravity drop seed tube where the geometry of the tube is intended to provide a horizontal velocity component is equal or near equal in magnitude to a given planting speed. In some examples (not shown), the row unit does not have a cartridge, but is instead may include another dispenser. The dispenser may be a dispenser such as a seed tube which may be coupled to the row unit and be configured to dispense seeds rearward into the opener 30.

Although the planting machine 20 provides high precision planting at high planting speeds, it is sometimes preferable to also firm the seeds S into the soil by running over them with an additional implement, known as a "seed firmer", after placement and prior to closing of the furrow F. A seed firmer is one example of a furrow following device that may be used with a planting machine. Other furrow following devices include a soil sensor carrier and a furrow shaper. Aspects of the furrow following device are described below in the context of a seed firmer.

Figure 3:
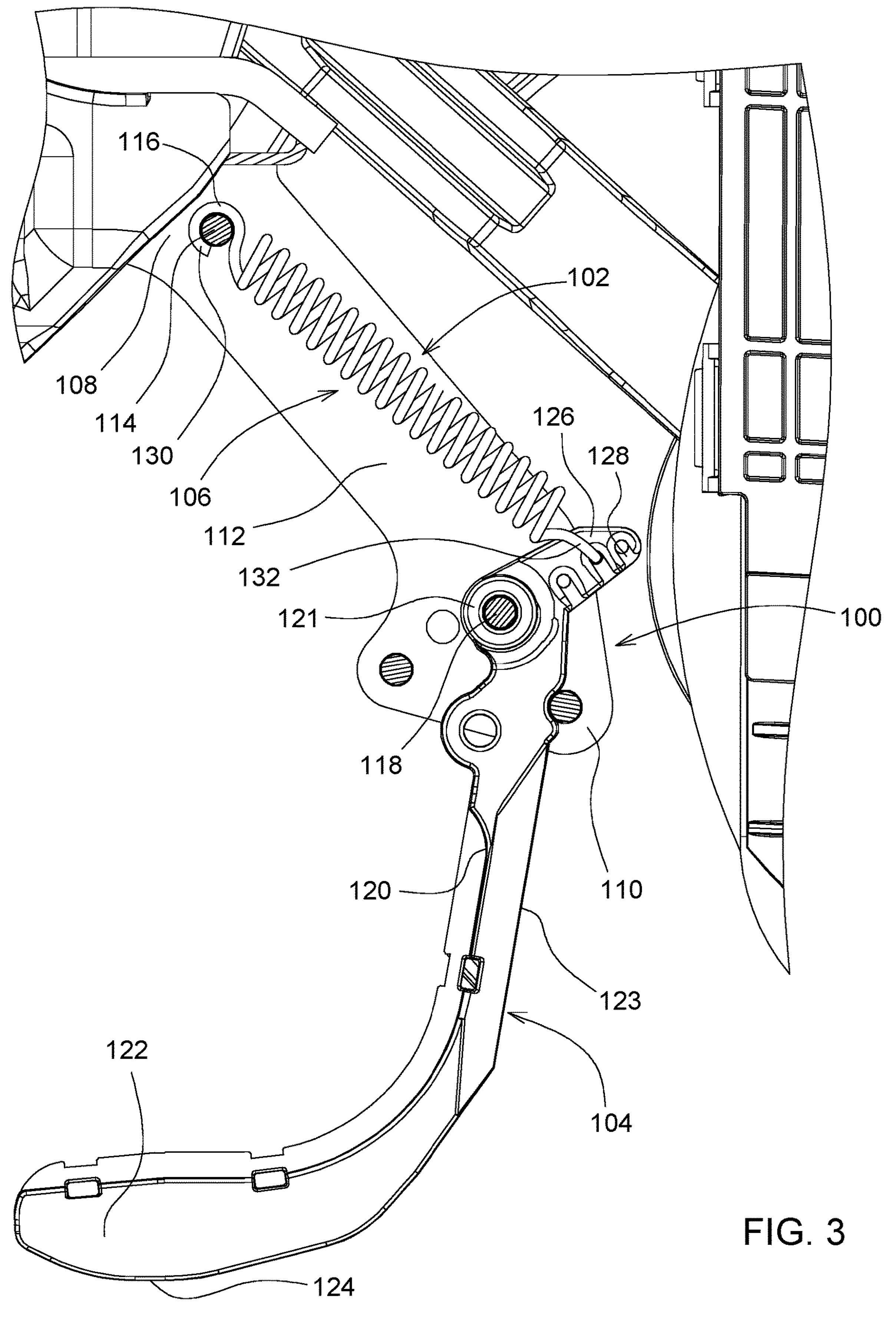
FIG. 3 shows a right side elevation view of a row unit of an agricultural planter with an example of a seed firmer mounted to a shank of the row unit.

FIG. 3 shows an example seed firming system 100 (i.e., seed firmer). The example seed firming system 100 provides adjustment mechanisms to provide a plurality of firming forces to a ground surface while the seed firming system 100 remains installed on a row unit. The seed firming system 100 includes an attachment bracket 102, an arm 104 coupled to the attachment bracket 102, and an elastic member 106 coupled to the arm 104.

The attachment bracket 102 provides an interface between a row unit (e.g., a frame of the row unit) and the seed firming system 100. In the example shown in FIG. 3 the attachment bracket 102 includes a first end 108, a second end 110, and a body 112 that extends between the first end 108 and the second end 110. The attachment bracket 102 further includes a row unit interface 114, a tension interface 116, and an arm interface 118. The row unit interface 114 provides a hole to receive a pin or bolt such as a locking pin (or other fastener), which may also extend into a portion of the row unit to secure the attachment bracket 102 thereto. The row unit interface 114 extends through a portion of the body 112 of the attachment bracket 102, providing an opening. In some examples, the row unit interface 114 may also be formed to accept a latch or other securing mechanism to couple the attachment bracket 102 to the row unit. In some examples, the portion of row unit interface extending through the attachment bracket 102 and/or the portion of the row unit interface extending through the row unit 104 has a diameter of about 5-25 mm, about 6-23 mm, about 7-21 mm, about 8-19 mm, about 9-17 mm, about 10-15 mm, about or about 11-13, or any other diameter that facilitates rotational or pivotal connection of the arm 104 to the attachment bracket 102.

The tension interface 116 is provided to secure the elastic member 106 to the attachment bracket 102. The tension interface 116 provides a hole to receive a pin or bolt such as a locking pin, which may further extend into or through a portion of the elastic member 106 to secure the attachment bracket 102 thereto. In some examples, the tension interface

116 may accept a bolt, a latch or other securing mechanism to couple the attachment bracket 102 to the elastic member 106. For example, the tension interface 116 may be configured to receive a pin that may pass through a hook protruding from or connected to a portion of the elastic member 106. Alternatively or additionally, the tension interface 116 may be configured to directly receive a portion of the elastic member 106. For example, the tension interface 116 may be sized and shaped to receive a hook protruding from the elastic member 106. In the example shown in FIG. 3, the tension interface 116 has a radius of about 8 mm. In some examples, the tension interface extending through the attachment bracket 102 and/or the portion of the arm interface extending through the arm 104 has a diameter of about 5-25 mm, about 6-23 mm, about 7-21 mm, about 8-19 mm, about 9-17 mm, about 10-15 mm, about or about 11-13, or any other diameter that facilitates rotational or pivotal connection of the arm 104 to the attachment bracket 102.

The arm interface 118 is a portion of the attachment bracket 102 provided to secure the arm 104 to the attachment bracket 102. The arm interface 118 is a hole to receive a pin or bolt such as a locking pin, which may further extend into a portion of the arm 104 to secure the attachment bracket 102 to the arm 104. In some examples, the arm interface 118 may accept a bolt, a latch or other securing mechanism to couple the arm 104 to the attachment bracket 102. The arm interface 118 has a diameter suitable for receiving a pin suitable for securing the arm 104 to the attachment bracket 102. In the example shown in FIG. 3, the arm interface 118 has a diameter of about 8 mm. In some examples, the portion of the arm interface extending through the attachment bracket 102 and/or the portion of the arm interface extending through the arm 104 has a diameter of about 5-25 mm, about 6-23 mm, about 7-21 mm, about 8-19 mm, about 9- 17 mm, about 10-15 mm, about or about 11-13, or any other diameter that facilitates rotational or pivotal connection of the arm 104 to the attachment bracket 102.

FIG. 3 further shows the arm 104. The arm 104 is configured to provide a downward force to press seeds into soil during planting. The arm 104 includes an upper portion 120, a lower portion 122, and a tension arm 126. The upper portion 120 of the arm 104 includes an interface 121 that is coupled to the attachment bracket 102 and a leading surface 123. The lower portion 122 includes a ground-facing surface 124. The leading surface 123 faces in a forward direction with respect to a direction of forward travel during planting operation. The ground-facing surface 124 faces downward opposite a ground surface of an operation and extends rearward of the upper portion 120 of the arm 104 with respect to a direction of forward travel during planting operation. As shown in FIG. 3, the upper portion 120 extends primarily vertically when mounted to the row unit for use, while the lower portion 122 extends primarily horizontally. As such, the leading surface 123 is disposed at an angle about 10 deg. to 30 deg. to a plane of the ground-facing surface 124 (e.g., +/−about 10 deg.). However, in some examples, the leading surface may be at a non-substantially perpendicular angle with a plane parallel to the plane of the ground facing surface 124.

In the example shown in FIG. 3, the tension arm 126 extends from the upper portion 120 of the arm 104 in a rearward direction with respect to a direction of forward travel during planting operation. The tension arm 126 provides a plurality of connection points for the elastic member 106 such that the elastic member 106 may be moved between multiple positions to cause the elastic member 106 to distribute a desired amount of elastic force through the ground-facing surface 124 to an abutting ground surface. Adjustment of the elastic member 106 as described above allows a user to adjust an amount of force distributed through the ground-facing surface 124 of the arm 104.

As such, unique relative horizontal and vertical force is distributed through the arm 104.

In the example shown in FIG. 3, the tension arm 126 is configured such that the tension arm 126 forms an obtuse angle with the ground-facing surface 124. However, in other examples, the tension arm 126 may be positioned to be parallel or form an acute angle with the ground-facing surface 124.

Figure 4:
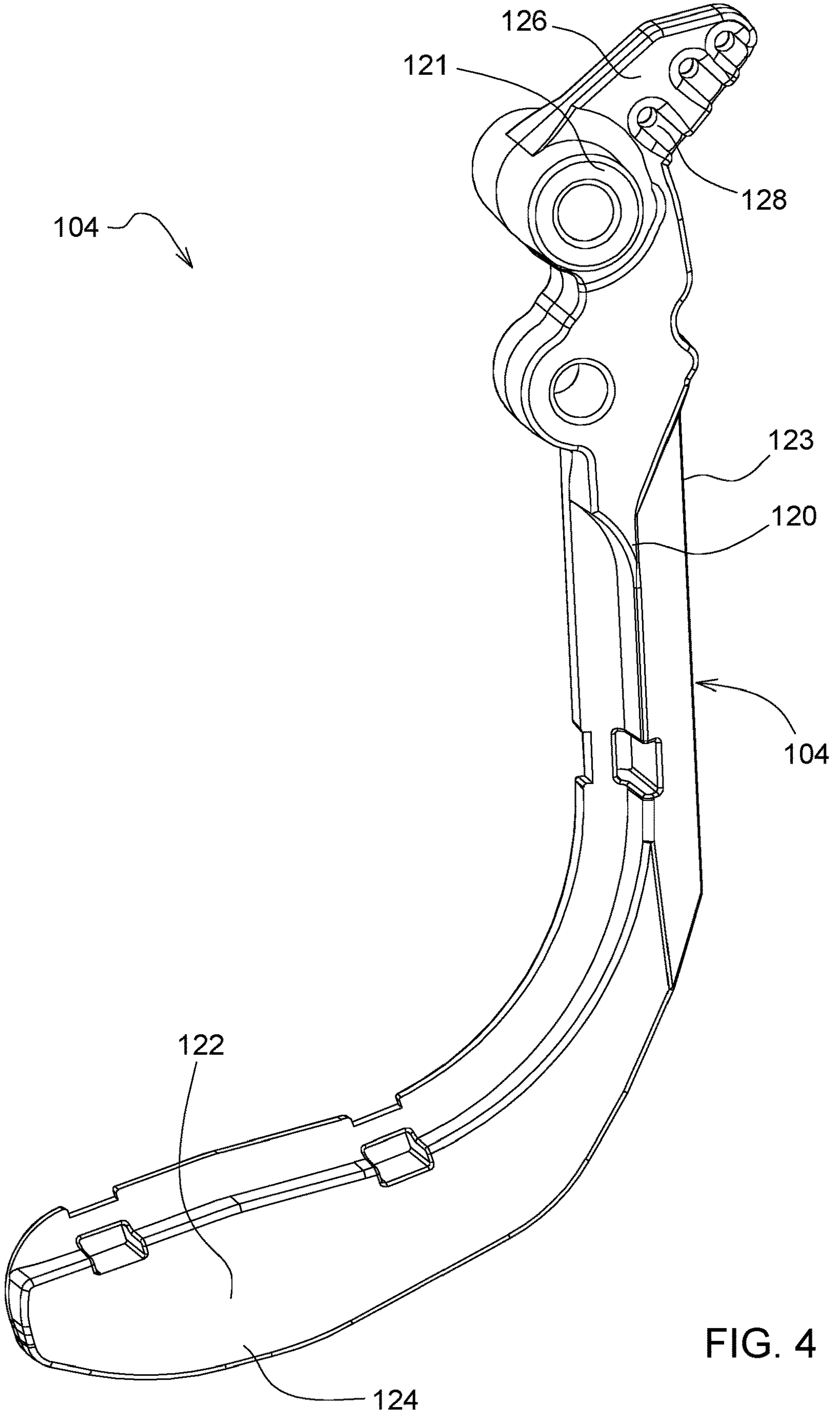
FIG. 4 shows the seed firmer shown in FIG. 3 with a detailed view of a tension arm of the seed firmer.

The tension arm 126 includes a plurality of tension connectors 128. The tension connectors 128 are provided to couple a portion of the elastic member 106 to the arm 104. As shown in FIGS. 3-4, the tension connectors 128 are openings distributed on the tension arm 126 such that the effective angle of the elastic member 106 with respect to the ground-facing surface 124 is changed based on which of the tension connectors is coupled to 128 the elastic member 106. In the example shown in FIGS. 3-4 the tension connectors 128 include three optional locations to couple the elastic member 106 to the arm 104. However, in some examples, the tension connectors 128 may include other suitable numbers of optional locations to couple the elastic member 106 to the arm 104. In some examples, the tension arm 126 includes an adjustable tension connector 128 that may be adjusted (e.g., slidably adjusted) to change the effective angle of the elastic member 106 with non-discrete attachment points. As such, a particular number of tension connectors can be included to provide a desired number of firming options. In some examples, the tension arm 126 may be disposed on or integrated into various portions of the arm 104. For example, the tension connectors 126 may be disposed in a portion of the lower portion 122 of the arm 104. In such examples where the tension connectors 126 are coupled to a segment of the lower portion of the arm, the lower portion of the arm is effective tension arm. In the example shown in FIG. 1 the tension connectors 126 are openings or holes in the tension arm 126. But in other examples, the tension connectors 126 may be some other interface such as hooks or fasteners, 126.

In some examples, the arm 104 is deformable and includes elastic properties such that the arm 104 may be configured at least in part to provide a desired combined elasticity with the elastic member 106. For example, the arm 104 may be formed from a flexible polymer with elastic properties such that the arm 104 exerts elastic force into a ground surface that the arm 104 deforms due to forces received from surface irregularities in the ground surface. The arm 104 may also be formed from a substantially rigid material such that typical forces received from surface irregularities would not deform the arm 104. In the example shown in FIGS. 3-6 the arm 104 is formed from thermoformed polymer (e.g., UHMW). The arm 104 may be formed from a plurality of materials such as carbon fiber, steel, aluminum or other materials. The arm 104 may also be formed at least in part from combined materials or modified materials. For examples, some materials may be modified from various treatments such as plating or hardening processing.

The elastic member 106 provides an elastic force in the seed firming system 100 that may be exerted through a portion of the arm 104 onto a ground surface. In the example shown in FIGS. 3-4, the elastic member 106 is a coil spring (extension spring) coupled to a portion of the arm 104 and a portion of the attachment bracket 102. The elastic member

106 includes a first connector 130 coupled to the attachment bracket 102 and a second connector 132 coupled to the arm 104. The second connector 132 is coupled to the arm 104 such that rotation of the arm 104 in a clockwise direction—as shown in FIGS. 3-4—engages the elastic member 106 such that the second connector 132 extends away from the first connector 130. Extension of the second connector 132 may further cause elastic force of the elastic member 106 to increase and act against a force causing the arm 104 to rotate in the clockwise direction (e.g., force due to ground surface deformation). As such, the elastic member 106 is configured to cause the arm 104 to rotate in a counterclockwise direction. This rotational force provides a vertical force component for the relatively horizontal ground-facing surface 124 to exert on a ground surface. In some examples, alternative attachment configurations may be used such that movement of the arm 104 in various directions may engage the elastic member 106. For example, the arm 102 may move in a vertical direction or in a counterclockwise direction to engage the elastic member.

A user may determine desired ratios between elasticity of the elastic member 106 and placement of the tension arm 126 to provide a desired amount of force through the ground-facing surface 124 to a ground surface. The ratios may be determined by utilizing spring force and kinematic calculations. For example, the tension arm placement 126 of the second connector 132 may be determined based at least in part on a measured elasticity of the elastic member 106. As such, the tension arm placement may be determined to provide forces through the ground-facing surface 124 that range from about 1 lbs. to about 20 lbs. of force. But other examples of the seed firming system 100 are contemplated that provide force outside of the above range at least in part by adjusting the materials, spring rate, and/or an effective moment arm of the elastic member 126 to provide the desired characteristics.

As described above, the elastic member 106 may be an extension spring such as a coil spring as shown in FIG. 1. The elastic member 106 may also be another elastic apparatus such as a torsion spring, compression spring, elastomer spring (e.g., bungee), or a leaf spring. The elastic member 106 may have various spring rates based on the range of desired tension for an application. In the example shown in FIG. 1, one elastic member 106 is shown. But in some examples, a plurality of elastic members 106 may be included to provide a desired elastic force.

In some examples where the elastic member 106 is a coil spring, such as the example shown in FIG. 3, the spring may be formed from a metal such as steel. In such examples, a coating may be desired to prevent corrosion and increase performance. A coating such as powder coat paint, eCoat epoxy, eCoat acrylic, or zinc plating may be used to form and/or coat the elastic member 106 to include desired elasticity characteristics and durability. For example, a coating as described above may be applied for operation where the elastic member 106 may be exposed to potentially corrosive agents such as moisture and mud. In other examples, the elastic member 106 may be formed from a non-corrosive material such as stainless steel.

Although an elastic member is shown in the example shown in FIGS. 3-4, in some examples, the elastic member can be substituted by an actuator capable of exerting force on the arm 104, such as a pneumatic actuator, a hydraulic actuator, or an electric motor.

Figure 5:
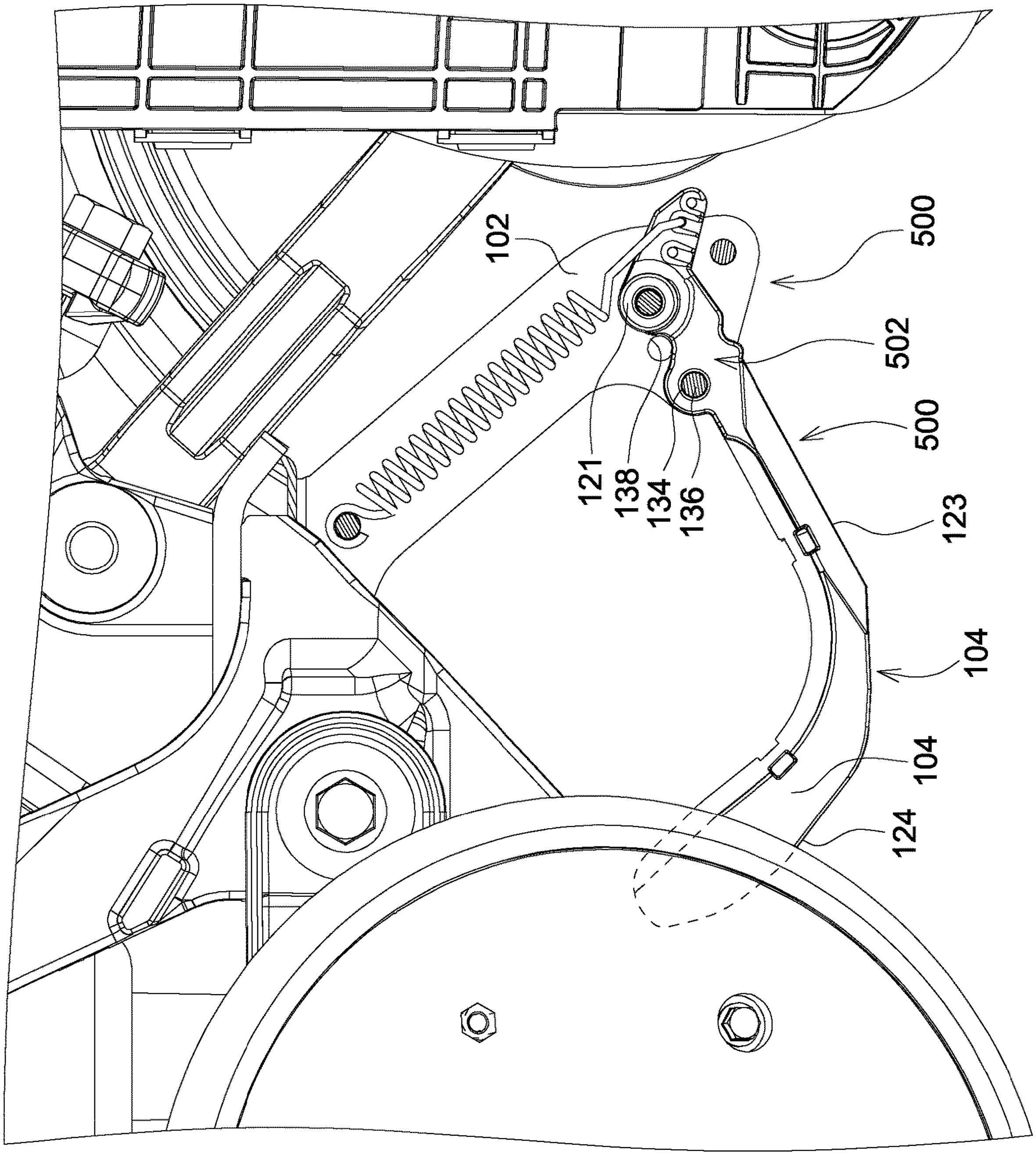
FIG. 5 shows a right side elevation view of a row unit of an agricultural planter with an example of a seed firmer mounted to a shank of the row unit locked in a stowed position.
Figure 6:
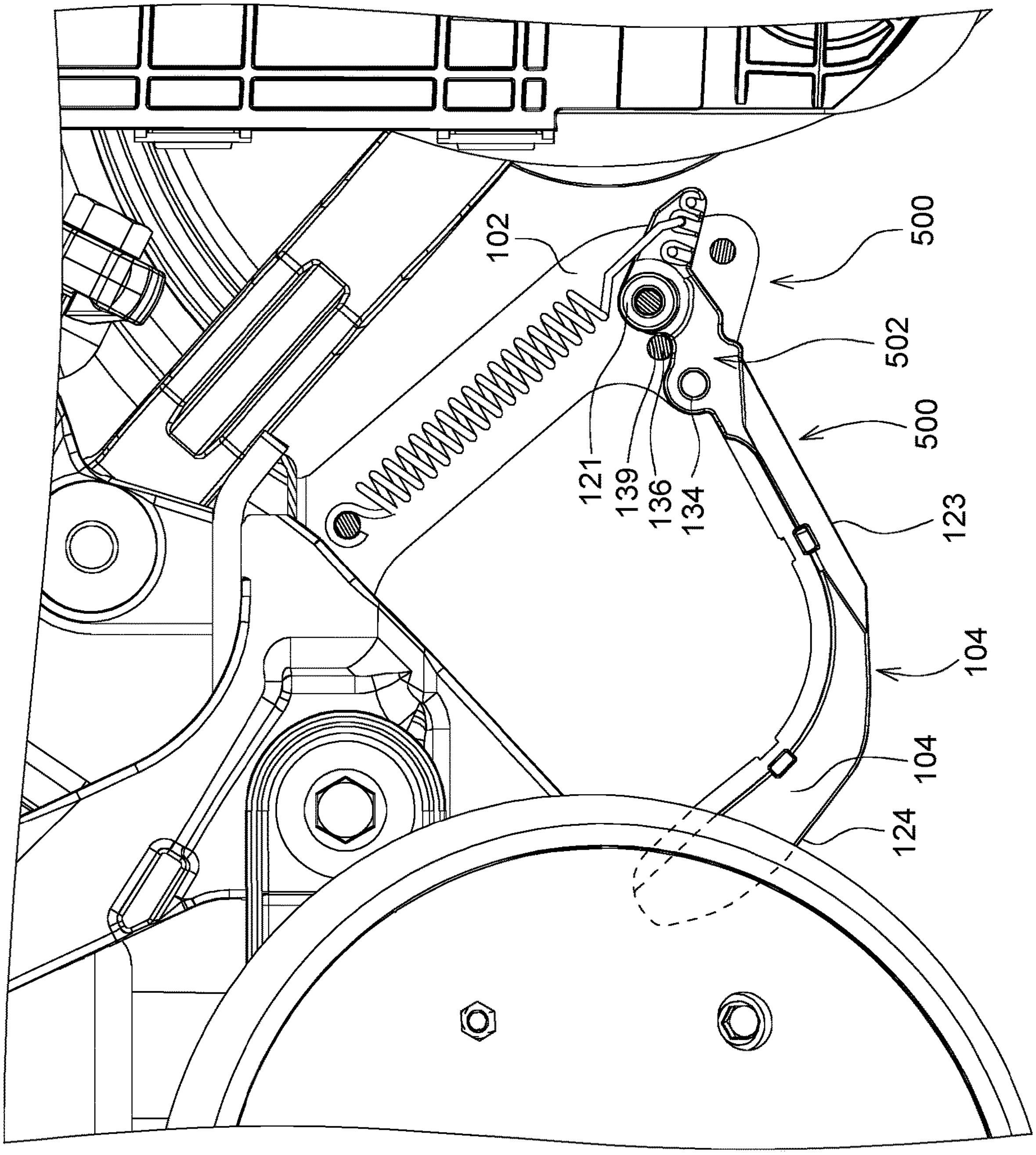
FIG. 6 shows a right side elevation view of a row unit of an agricultural planter with an example of a seed firmer mounted to a shank of the row unit locked in an uppermost travel position.

FIGS. 5-6, show an example seed firming system 500 that includes a stowing mechanism 502. The stowing mechanism 502 provides a means to dispose the arm 104 of the seed firming system 500 in an extended position and secure the arm 104 an alternative stowed position. FIG. 3 shows the arm 104 in the extended position. FIG. 4 shows the arm 104 in the stowed position. During operation, it may be desirable for a seed firming system 500 to avoid a ground surface to prevent damage to a ground surface or the seed firming system 500. However, it may also be desirable for the seed firming system 500 to contact a ground surface for operation in an alternative location. As such, the stowing mechanism 502 is provided to accommodate both scenarios (e.g., extended and non-extended arm 104). In the extended position, the seed firming system 500 is substantially positioned to contact a ground surface, and in the stowed position the ground-facing surface is substantially positioned to avoid a ground surface. The seed firming system 500 is further securable such that movement of the firming system 500 does not cause the arm 104 to descend and abut a ground surface.

As shown in FIGS. 5-6, the stowing mechanism 502 includes a plurality of stowing-pins 134 a first stowing pin receiver 136 and a second stowing pin receiver 138 disposed in the arm 104. The first and second stowing stowing-pin receivers 136, 138 are configured to receive a rigid object such as a pin or bar to rigidly secure the arm 104 in a desired stowing position. The first stowing pin receiver 136 is an opening, provided to receive and circumferentially secure the stowing pin 134 therethrough. The second stowing pin receiver 138 is a notch, provided to receive and restrict the stowing pin 134 in in one or more directions and release the stowing pin in one or more other directions. In the example shown in FIG. 5-6, the pin receiver 138 allows movement of the arm 104 between a desired position and the extended position. However, the pin receiver restricts movement of the arm 104 in other directions. The attachment bracket 102 may also include bracket openings that correspond with the pin receivers 136, 138. As such, the arm 104, may be secured with respect to the attachment member when the stowing pin 134 disposed through the pin receivers 136, 138.

As described above, the arm 104 is movable between the stowed position and the extended position. In the extended position, the stowing pin 134 is disposed through the first pin receiver 136. In the stowed position the stowing pin 134 104 is disposed through the attachment bracket 102 and through the second pin receiver 138. In the example shown in FIGS. 5-6, the first pin receiver 136 and the second pin receiver 138 are circumferentially spaced apart. As such, the stowing pin 134 secures the arm 104 in a rotationally unique position (e.g., the extended position and the stowed position), based on whether the stowing pin 134 extends into the first pin receiver 136 or the second pin receiver 138. In some examples the arm 104 stows and extends in without rotation. For example, the arm 104 may translate linearly between the stowed position and the extended position. In some such examples, the pin receivers 136, 138 can be disposed in alternative configurations, such as in linear series. In some examples, the stowing mechanism 502 may include more than two pin receivers such that the arm may be disposed in more than two positions. In some examples, the arm 104 is not secured by a stowing pin 134 but is held substantially in place by alternative means such as a spring force that causes the arm 104 to remain extended unless moved by a user and locked in the stowed position.

The example shown in FIGS. 5-6 a stowing pin 134 is disposed through the arm 104 to secure the arm 104 to the attachment bracket 102. But in other examples, other securing mechanisms such as a magnet, an electromagnet, a motor, or a latch may hold the arm 104 in the stowed position or the extended position. In some examples such as the example shown in FIGS. 5-6, a user may manually raise and lower the arm 104 such that the user may move the arm 104 between the extended position and the stowed position and insert/remove the stowing pins 134 to secure the arm 104 in a desired position. But, in other examples, the stowing mechanism 502 may be remotely operated by an electronic actuating mechanism and/or a wireless or electronic controller that actuates the stowing mechanism 502 to raise, lower, and/or secure the arm 104.

As used herein, "e.g.," is utilized to non-exhaustively list examples and carries the same meaning as alternative illustrative phrases such as "including," "including, but not limited to," and "including without limitation." Unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

While the above describes example embodiments of the present disclosure, these descriptions should not be viewed in a limiting sense. Rather, other variations and modifications may be made without departing from the scope and spirit of the present disclosure as defined in the appended claims.

The foregoing description and examples have been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for seed firming have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for seed firming. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for seed firming has been disclosed. Although the systems and methods for seed firming have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein but should be determined only by a fair reading of the claims that follow.

What is claimed is:

1. A seed firming system for a planting machine, the seed firming system comprising:

an attachment bracket having a portion provided for attachment to a row unit of the planting machine;

an arm pivotably coupled to the attachment bracket and including a ground-facing surface configured for engagement with a ground surface during planting, a tension arm spaced apart from the ground-facing surface, and a plurality of tension connectors disposed in the tension arm;

an elastic member comprising a first end coupled to the attachment bracket, and a second end removably coupled to one of the plurality of tension connectors;

wherein the second end of the elastic member is interchangeably couplable to each of the plurality of tension connectors; and wherein the elastic member is configured to provide a unique elastic force through the ground-facing surface when coupled to each respective one of the plurality of tension connectors.

2. The seed firming system of claim 1, wherein the second end of the elastic member is movable between each respective one of the plurality of tension connectors while the arm is coupled to the attachment bracket.

3. The seed firming system of claim 1, wherein each respective one of the plurality of tension connectors is arranged such that an effective angle between the elastic member and the tension arm varies when the elastic member is coupled to each respective one of the plurality of tension connectors.

4. The seed firming system of claim 1, wherein the plurality of tension connectors is disposed in series along a length of the tension arm.

5. The seed firming system of claim 1, wherein the arm further comprises a leading surface disposed at an angle with respect to a plane of the ground-facing surface.

6. The seed firming system of claim 5, wherein the angle is an angle from about 10 deg. to about 30 deg.

7. The seed firming system of claim 5, wherein the tension arm is coupled to the leading surface of the arm.

8. The seed firming system of claim 1, wherein the arm comprises a substantially rigid material.

9. The seed firming system of claim 1, wherein the arm comprises a substantially deformable material.

10. The seed firming system of claim 1, wherein the elastic member is a spring.

11. The seed firming system of claim 1, wherein the elastic member is a coil spring.

12. A seed firming system for a planting machine, the seed firming system comprising:

an attachment bracket having a portion provided for attachment to a row unit of the planting machine;

an arm coupled to the attachment bracket, the arm including a ground-facing surface for engagement with a ground surface during planting; and a stowing mechanism having a first pin operable to secure the arm relative to the attachment bracket, wherein the first pin is extendable through a portion of the attachment bracket and the arm such that the arm is locked in a fixed position with respect to the attachment bracket, and wherein the stowing mechanism is selectively configurable between a first position in which the ground-facing surface is positioned to abut the ground surface during operation and a second position in which the ground-facing surface is positioned to be spaced apart from the ground surface during operation.

13. The seed firming system of claim 12, wherein the arm is pivotably coupled to the attachment bracket.

14. The seed firming system of claim 12, wherein the arm comprises a first pin receiver configured to secure the arm in the first position when the pin is extended through the attachment bracket and the first pin receiver.

15. The seed firming system of claim 14, wherein the arm is at least partially pivotable when in the first position.

16. The seed firming system of claim 15, wherein the arm comprises a second pin receiver configured to secure the arm in the second position when the pin is extended through the attachment bracket and the second pin receiver.

17. The seed firming system of claim 12, wherein the arm is elastically biased to the first position.

18. The seed firming system of claim 12, wherein the stowing mechanism is configured such that the arm is movable between the second position and the first position while the arm is coupled to the attachment bracket.

19. A row unit comprising a furrow opener, furrow closing wheels behind the opener, a seed dispenser between the opener and the closing wheels, and a seed firming system coupled to the row unit behind the seed dispenser and forward of the closing wheels, wherein an attachment bracket having a portion provided for attachment to the row unit;

an arm coupled to the attachment bracket, the arm including a ground-facing surface for engagement with a ground surface during planting; and a stowing mechanism having a first pin operable to secure the arm relative to the attachment bracket, wherein the first pin is extendable through a portion of the attachment bracket and the arm such that the arm is locked in a fixed position with respect to the bracket, and wherein the stowing mechanism is selectively configurable between first position in which the ground-facing surface is positioned to abut the ground surface during operation and a second position in which the ground-facing surface is positioned to be spaced apart from the ground surface during operation.

* * * * *